United States Patent
Thresh et al.

(10) Patent No.: US 11,835,446 B2
(45) Date of Patent: Dec. 5, 2023

(54) FOUNTAIN SOLUTION THICKNESS MEASUREMENT SYSTEM AND METHOD USING ELLIPSOMETRY

(71) Applicant: Xerox Corporation, Norwalk, CT (US)

(72) Inventors: Donald Thresh, Fairport, NY (US); Jonathan Ireland, Lancaster, PA (US); Bruce H. Smith, Webster, NY (US); Michael N. Soures, Webster, NY (US); James D. Vanbortel, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 372 days.

(21) Appl. No.: 17/355,692

(22) Filed: Jun. 23, 2021

(65) Prior Publication Data

US 2022/0412878 A1    Dec. 29, 2022

(51) Int. Cl.
*G01N 21/21* (2006.01)
*B41F 7/24* (2006.01)
*B41N 3/08* (2006.01)

(52) U.S. Cl.
CPC .............. *G01N 21/211* (2013.01); *B41F 7/24* (2013.01); *B41N 3/08* (2013.01); *B41P 2233/30* (2013.01)

(58) Field of Classification Search
CPC . G01N 21/211; B41F 7/24; B41N 3/08; B41P 2233/30
USPC ....................................................... 356/503
See application file for complete search history.

(56) References Cited

U.S. PATENT DOCUMENTS

| | | | | |
|---|---|---|---|---|
| 5,826,507 | A | * | 10/1998 | Lim .................... B41N 3/08 101/DIG. 45 |
| 2012/0103212 | A1 | | 5/2012 | Stowe et al. |
| 2012/0103221 | A1 | | 5/2012 | Stowe et al. |
| 2012/0274914 | A1 | * | 11/2012 | Stowe .................. B41F 31/302 355/53 |
| 2021/0402821 | A1 | * | 12/2021 | Craig ................. B41F 33/0054 |

OTHER PUBLICATIONS

Co-pending U.S. Appl. No. 17/137,473, filed Dec. 30, 2020.
Co-pending U.S. Appl. No. 16/916,907, filed Jun. 30, 2020.
Co-ending U.S. Appl. No. 16/917,044, filed Jun. 30, 2020.
Co-pending U.S. Appl. No. 17/137,516, filed Dec. 30, 2020.
Co-pending U.S. Appl. No. 16/913,302, filed Jun. 26, 2020.
Co-pending U.S. Appl. No. 17/137,711, filed Dec. 30, 2020.
Co-pending U.S. Appl. No. 16/913,351, filed Jun. 26, 2020.
Co-pending U.S. Appl. No. 17/137,626, filed Dec. 30, 2020.

(Continued)

*Primary Examiner* — Michael A Lyons
*Assistant Examiner* — Omar H Nixon
(74) *Attorney, Agent, or Firm* — Caesar Rivise, PC (57) ABSTRACT

An optical light reflectance measurement system above an imaging member surface measures fountain solution surface light reflectance interference on reflective substrate portions of the imaging member surface in real-time during a printing operation. The measured light reflectance interference corresponds to a thickness of the fountain solution layer and may be used in a feedback loop to actively control fountain solution layer thickness by adjusting the volumetric feed rate of fountain solution added onto the imaging member surface during a printing operation to reach a desired uniform thickness for the printing. This fountain solution monitoring system may be fully automated.

20 Claims, 6 Drawing Sheets

(56) References Cited

OTHER PUBLICATIONS

Co-pending U.S. Appl. No. 16/913,626, filed Jun. 26, 2020.
Co-pending U.S. Appl. No. 17/149,161, filed Jan. 14, 2021.
Co-pending U.S. Appl. No. 17/161,879, filed Jan. 29, 2021.
Co-pending U.S. Appl. No. 17/177,262, filed Feb. 17, 2021.
Co-pending U.S. Appl. No. 17/336,729, filed Jun. 2, 2021.
Co-pending U.S. Appl. No. 17/345,643, filed Jun. 11, 2021.

* cited by examiner

FOUNTAIN SOLUTION THICKNESS MEASUREMENT SYSTEM AND METHOD USING ELLIPSOMETRY

FIELD OF DISCLOSURE

This invention relates generally to digital printing systems, and more particularly, to fountain solution deposition systems and methods for use in lithographic offset printing systems.

BACKGROUND

Conventional lithographic printing techniques cannot accommodate true high speed variable data printing processes in which images to be printed change from impression to impression, for example, as enabled by digital printing systems. The lithography process is often relied upon, however, because it provides very high quality printing due to the quality and color gamut of the inks used. Lithographic inks are also less expensive than other inks, toners, and many other types of printing or marking materials.

Ink-based digital printing uses a variable data lithography printing system, or digital offset printing system, or a digital advanced lithography imaging system. A "variable data lithography system" is a system that is configured for lithographic printing using lithographic inks and based on digital image data, which may be variable from one image to the next. "Variable data lithography printing," or "digital ink-based printing," or "digital offset printing," or digital advanced lithography imaging is lithographic printing of variable image data for producing images on a substrate that are changeable with each subsequent rendering of an image on the substrate in an image forming process.

For example, a digital offset printing process may include transferring ink onto a portion of an imaging member (e.g., fluorosilicone-containing imaging member, printing plate) having a surface or imaging blanket that has been selectively coated with a fountain solution (e.g., dampening fluid) layer according to variable image data. According to a lithographic technique, referred to as variable data lithography, a non-patterned reimageable surface of the imaging member is initially uniformly coated with the fountain solution layer. An imaging system then evaporates regions of the fountain solution layer in an image area by exposure to a focused radiation source (e.g., a laser light source, high power laser) to form pockets. A temporary pattern latent image in the fountain solution is thereby formed on the surface of the digital offset imaging member. The latent image corresponds to a pattern of the applied fountain solution that is left over after evaporation. Ink applied thereover is retained in the pockets where the laser has vaporized the fountain solution. Conversely, ink is rejected by the plate regions where fountain solution remains. The inked surface is then brought into contact with a substrate at a transfer nip and the ink transfers from the pockets in the fountain solution layer to the substrate. The fountain solution may then be removed, a new uniform layer of fountain solution applied to the printing plate, and the process repeated.

Digital printing is generally understood to refer to systems and methods of variable data lithography, in which images may be varied among consecutively printed images or pages. "Variable data lithography printing," or "ink-based digital printing," or "digital offset printing" are terms generally referring to printing of variable image data for producing images on a plurality of image receiving media substrates, the images being changeable with each subsequent rendering of an image on an image receiving media substrate in an image forming process. "Variable data lithographic printing" includes offset printing of ink images generally using specially-formulated lithographic inks, the images being based on digital image data that may vary from image to image, such as, for example, between cycles of an imaging member having a reimageable surface. Examples are disclosed in U.S. Patent Application Publication No. 2012/0103212 A1 (the '212 Publication) published May 3, 2012 based on U.S. patent application Ser. No. 13/095,714, and U.S. Patent Application Publication No. 2012/0103221 A1 (the '221 Publication) also published May 3, 2012 based on U.S. patent application Ser. No. 13/095,778.

The inventors have found that digital printing processes are sensitive to the amount of fountain solution applied to the imaging member blanket. If too much fountain solution is applied to the imaging member surface, then the laser may not be able to boil/evaporate the fountain solution and no image will be created on the blanket. If too little fountain solution is applied to the imaging member surface, then the ink will not be rejected in the non-imaged regions leading to high background. Currently, there is no way to measure how much fountain solution is deposited on the imaging member blanket in real-time during a printing operation. Further, current fountain solution systems operate open loop, where the amount of fountain solution is manually adjustable based on image quality of previous print jobs. In this state, fountain solution systems are at the mercy of printing device noises and may require constant manual adjustments.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing an image forming device controlling fountain solution thickness on a non-reflective imaging member surface of a rotating imaging member, with the image forming device having a light reflectance detector and a controller. The image forming device also includes a reflective substrate attached to the non-reflective imaging member surface at non-image forming regions along a first side gutter of the imaging member surface outside a imageable area of the imaging member surface to form a reflective surface on the otherwise non-reflective surface, with the imaging member surface having a layer of fountain solution fluid dispensed on both the reflective surface and the non-reflective surface at a fountain solution dispense rate. The light reflectance detector is spatially separate from the imaging member surface forming a gap therebetween, with the light reflectance detector configured to measure a light reflectance from the reflective surface with the fountain solution fluid layer thereon. The controller is in communication with the light reflectance detector and the fountain solution applicator to modify the fountain solution dispense rate based on the measured light reflectance.

According to aspects illustrated herein, an exemplary method of controlling fountain solution thickness on a non-reflective imaging member surface of a rotating imaging member includes applying a fountain solution fluid layer at a dispense rate onto the imaging member surface, the imaging member surface being non-reflective with a reflective substrate attached to the non-reflective imaging member surface at non-image forming regions along a gutter of the imaging member surface outside a imageable area of the imaging member surface to form a reflective surface on the otherwise non-reflective surface, the fountain solution fluid layer being dispensed on both the reflective surface and the non-reflective surface at the fountain solution dispense rate with a fountain solution applicator. The exemplary method also includes measuring a light reflectance from the reflective surface having the fountain solution fluid layer thereon with a light reflectance detector spatially separate from the imaging member surface and forming a gap therebetween, and modifying the fountain solution dispense rate via controller in communication with the light reflectance detector and the fountain solution applicator based on the measured light reflectance.

In examples, after measuring light reflectance interference of the fountain solution fluid layer surface, the methods may include comparing the measured light reflectance interference value to a target light reflectance interference value and/or estimating a thickness of the applied fountain solution fluid layer based on the measured light reflectance interference value and then comparing the estimated thickness of the applied fountain solution fluid layer with a target thickness. In such examples the step of modifying the fountain solution dispense rate based on the measured light reflectance interference value may include modifying the fountain solution dispense rate based on the comparison between the measured light reflectance interference value and the target light reflectance interference value, modifying the fountain solution dispense rate based on the estimated thickness of the applied fountain solution fluid layer, and/or modifying the fountain solution dispense rate based on the comparison between the estimated thickness of the applied fountain solution fluid layer and the target thickness.

According to aspects described herein, an exemplary digital image forming device controls fountain solution dispense rate on an imaging member surface of a rotating imaging member. The digital image forming device may include the rotatable imaging member, a light reflectance detector and a controller. The rotatable imaging member has an imaging member surface that is non-reflective over an imageable area thereon. The imaging member surface includes a reflective substrate attached at non-image forming regions thereon along a first side gutter of the imaging member surface outside the imageable area, with the imaging member surface having a layer of fountain solution fluid dispensed on portions of both the imageable area and the non-image forming regions at a fountain solution dispense rate. The light reflectance detector is spatially separate from the imaging member surface forming a gap therebetween. The light reflectance detector is configured to measure a light reflectance from the reflective substrate with the fountain solution fluid layer thereon. The controller is in communication with the light reflectance detector and the fountain solution applicator, with the controller configured to determine an interference between light reflectance from the reflective substrate and the measured light reflectance from the reflective substrate with the fountain solution fluid layer thereon. The controller is also configured to modify the fountain solution dispense rate based on the interference.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for inking from an inking member to the reimageable surface of a digital imaging member.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The term "controller" or "control system" is used herein generally to describe various apparatus such as a computing device relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a controller, computer, computing platform, computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "media", "print media", "print substrate" and "print sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, and foils, as readily understood by a skilled artisan.

The term "image forming device", "printing device" or "printing system" as used herein may refer to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing system" may handle sheets, webs, substrates, and the like. A printing system can place marks on any surface, and the like, and is any machine that reads marks on input sheets; or any combination of such machines.

The term "fountain solution" or "dampening fluid" refers to dampening fluid that may coat or cover a surface of a structure (e.g., imaging member, transfer roll) of an image forming device to affect connection of a marking material (e.g., ink, toner, pigmented or dyed particles or fluid) to the surface. The fountain solution may include water optionally with small amounts of additives (e.g., isopropyl alcohol, ethanol) added to reduce surface tension as well as to lower evaporation energy necessary to support subsequent laser patterning. Low surface energy solvents, for example volatile silicone oils, can also serve as fountain solutions. Fountain solutions may also include wetting surfactants, such as silicone glycol copolymers. The fountain solution may include D4 or D5 dampening fluid alone, mixed, and/or with wetting agents. The fountain solution may also include Isopar G, Isopar H, Dowsil OS20, Dowsil OS30, and mixtures thereof.

Inking systems or devices may be incorporated into digital offset image forming device architecture so that the inking system is arranged about a central imaging plate, also referred to as an imaging member. In such a system, the imaging member is a rotatable imaging member, including a conformable blanket around a cylindrical drum with the conformable blanket including the reimageable surface. This blanket layer has specific properties such as composition, surface profile, and so on so as to be well suited for receipt and carrying a layer of a fountain solution. A surface of the imaging member is reimageable making the imaging member a digital imaging member. The surface is constructed of elastomeric materials and conformable. A paper path architecture may be situated adjacent the imaging member to form a media transfer nip.

A layer of fountain solution may be applied to the surface of the imaging member by a dampening system. In a digital evaporation step, particular portions of the fountain solution layer deposited onto the surface of the imaging member may be evaporated by a digital evaporation system. For example, portions of the fountain solution layer may be vaporized by an optical patterning subsystem such as a scanned, modulated laser that patterns the fluid solution layer to form a latent image. In a vapor removal step, the vaporized fountain solution may be collected by a vapor removal device or vacuum to prevent condensation of the vaporized fountain solution back onto the imaging plate.

In an inking step, ink may be transferred from an inking system to the surface of the imaging member such that the ink selectively resides in evaporated voids formed by the patterning subsystem in the fountain solution layer to form an inked image. In an image transfer step, the inked image is then transferred to a print substrate such as paper via pressure at the media transfer nip.

In a digital variable printing process, previously imaged ink must be removed from the imaging member surface to prevent ghosting. After an image transfer step, the surface of the imaging member may be cleaned by a cleaning system so that the printing process may be repeated. For example, tacky cleaning rollers may be used to remove residual ink and fountain solution from the surface of the imaging member.

A drawback of digital print processes is print quality sensitivity to the amount of fountain solution deposited onto the imaging blanket. It is estimated that a very thin layer of fountain solution (e.g., 30-100 nm thickness range) is required on the blanket for optimal print process setup. This makes measuring the fountain solution thickness on the imaging blanket most difficult.

Figure 1:
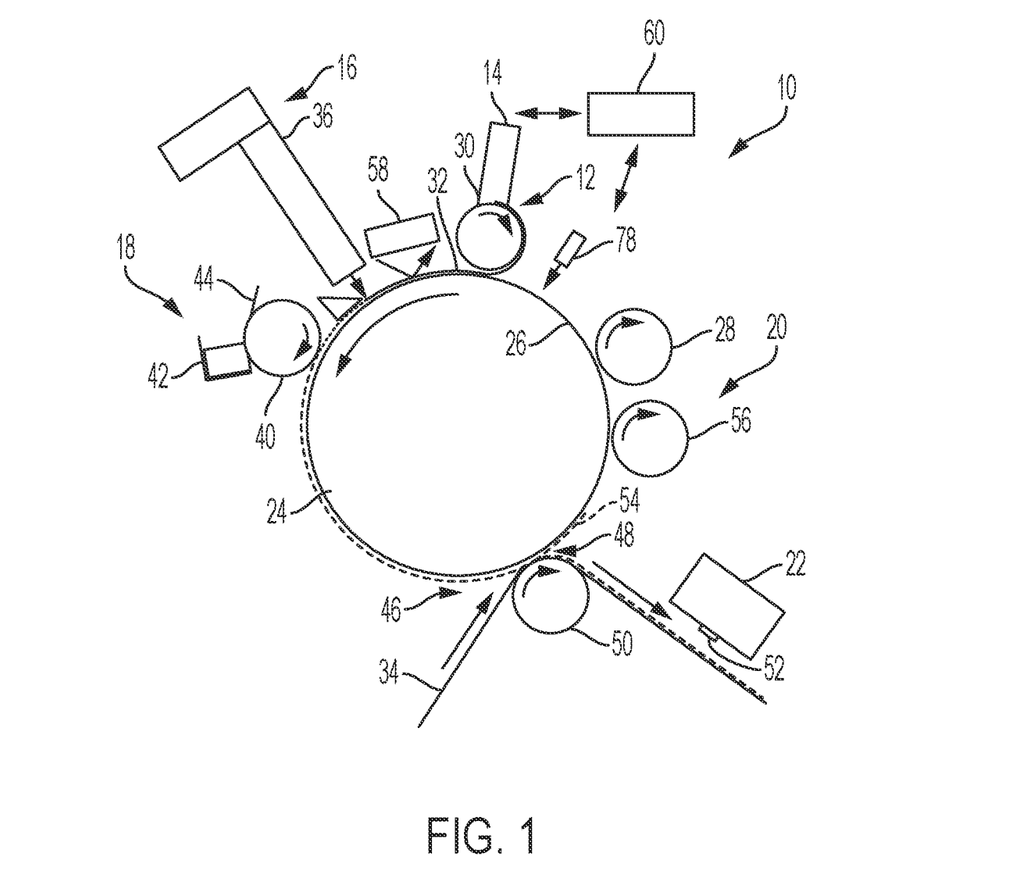
FIG. 1 is block diagram of a digital image forming device in accordance with examples of the embodiments.

FIG. 1 depicts an exemplary ink-based digital image forming device 10. The image forming device 10 may include dampening station 12 having fountain solution applicator 14, optical patterning subsystem 16, inking apparatus 18, and a cleaning device 20. The image forming device 10 may also include one or more rheological conditioning subsystems 22 as discussed, for example, in greater detail below. FIG. 1 shows the fountain solution applicator 14 arranged with a digital imaging member 24 having a reimageable surface 26. While FIG. 1 shows components that are formed as rollers, other suitable forms and shapes may be implemented.

The imaging member surface 26 may be wear resistant and flexible. The surface 26 may be reimageable and conformable, having an elasticity and durometer, and sufficient flexibility for coating ink over a variety of different media types having different levels of roughness. A thickness of the reimageable surface layer may be, for example, about 0.5 millimeters to about 4 millimeters. The surface 26 should have a weak adhesion force to ink, yet good oleophilic wetting properties with the ink for promoting uniform inking of the reimageable surface and subsequent transfer lift of the ink onto a print substrate.

The soft, conformable surface 26 of the imaging member 24 may include, for example, hydrophobic polymers such as silicones, partially or fully fluorinated fluorosilicones and FKM fluoroelastomers. Other materials may be employed, including blends of polyurethanes, fluorocarbons, polymer catalysts, platinum catalyst, hydrosilyation catalyst, etc. The surface may be configured to conform to a print substrate on which an ink image is printed. To provide effective wetting of fountain solutions such as water-based dampening fluid, the silicone surface need not be hydrophilic, but may be hydrophobic. Wetting surfactants, such as silicone glycol copolymers, may be added to the fountain solution to allow the fountain solution to wet the reimageable surface 26. The imaging member 24 may include conformable reimageable surface 26 of a blanket or belt wrapped around a roll or drum. The imaging member surface 26 may be temperature controlled to aid in a printing operation. For example, the imaging member 24 may be cooled internally (e.g., with chilled fluid) or externally (e.g., via a blanket chiller roll to a temperature (e.g., about 10° C.-60° C.) that may aid in the image forming, transfer and cleaning operations of image forming device 10.

The reimageable surface 26 or any of the underlying layers of the reimageable belt/blanket may incorporate a radiation sensitive filler material that can absorb laser energy or other highly directed energy in an efficient manner. Examples of suitable radiation sensitive materials are, for example, microscopic (e.g., average particle size less than 10 micrometers) to nanometer sized (e.g., average particle size less than 1000 nanometers) carbon black particles, carbon black in the form of nano particles of, single or multi-wall nanotubes, graphene, iron oxide nano particles, nickel plated nano particles, etc., added to the polymer in at least the near-surface region. It is also possible that no filler material is needed if the wavelength of a laser is chosen so to match an absorption peak of the molecules contained within the fountain solution or the molecular chemistry of the outer surface layer. As an example, a 2.94 μm wavelength laser would be readily absorbed due to the intrinsic absorption peak of water molecules at this wavelength.

The fountain solution applicator 14 may be configured to deposit a layer of fountain solution onto the imaging member surface 26 directly or via an intermediate member (e.g., roller 30) of the dampening station 12. While not being limited to particular configuration, the fountain solution applicator 14 may include a series of rollers, sprays or a vaporizer (not shown) for uniformly wetting the reimageable surface 26 with a uniform layer of fountain solution with the thickness of the layer being controlled. The series of rollers may be considered as dampening rollers or a dampening unit, for uniformly wetting the reimageable surface 26 with a layer of fountain solution. The fountain solution may be applied by fluid or vapor deposition to create a thin fluid layer 32 (e.g., less than 5 μm, between about 5 nm and 200 nm, about 10 nm to 100 nm) of the fountain solution for uniform wetting and pinning. The applicator 14 may include a slot at its output across the imaging member 26 or intermediate roller 30 to output fountain solution to the imaging member surface 26.

Figure 2:
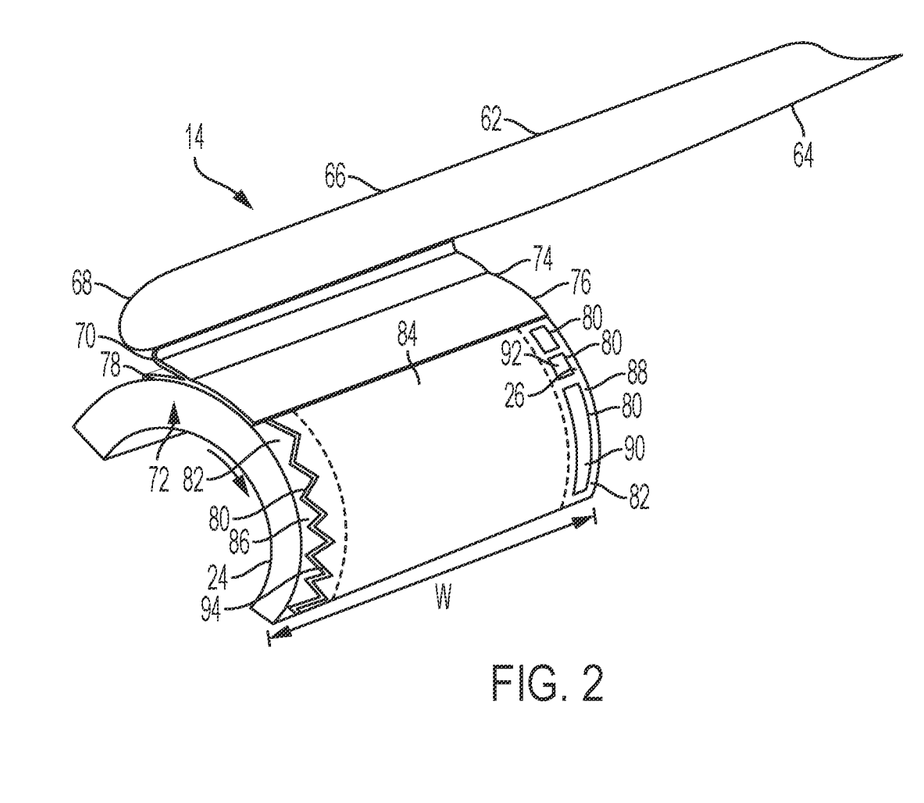
FIG. 2 is a perspective view of an exemplary fountain solution applicator.

FIG. 2 depicts another exemplary fountain solution applicator 14 that may apply a fountain solution layer directly onto the imaging member surface 26. The fountain solution applicator 14 includes a supply chamber 62 that may be generally cylindrical defining an interior for containing fountain solution vapor therein. The supply chamber 62 includes an inlet tube 64 in fluid communication with a fountain solution supply (not shown), and a tube portion 66 extending to a closed distal end 68 thereof. A supply channel 70 extends from the supply chamber 62 to adjacent the imaging member surface 26, with the supply channel defining an interior in communication with the interior of the supply chamber to enable flow of fountain solution vapor from the supply chamber through the supply channel and out a supply channel outlet slot 72 for deposition over the imaging member surface, where the fountain solution vapor condenses to a fluid on the imaging member surface.

A vapor flow restriction boarder 74 extends from the supply channel 70 adjacent the reimageable surface 26 to confine fountain solution vapor provided from the supply channel outlet slot 72 to a condensation region defined by the restriction boarder and the adjacent reimageable surface to support forming a layer of fountain solution on the reimageable surface via condensation of the fountain solution vapor onto the reimageable surface. The restriction boarder 74 defines the condensation region over the surface 26 of the imaging member 24. The restriction boarder includes arc walls 76 that face the imaging member surface 26, and boarder wall 78 that extends from the arc walls towards the imaging member surface. The reimageable surface 26 of the imaging member 24 may have a width W parallel to the supply channel 70 and supply channel outlet slot 72, with the outlet slot having a width across the imaging member configured to enable fountain solution vapor in the supply chamber interior to communicate with the imaging member surface across its width. In examples where the fountain solution applicator 14 deposits fountain solution vapor onto the imaging member surface 26 that condenses to form the fountain solution layer 32, excess vapor may be collected and removed after sufficient condensation, for example, via a vacuum or other vapor removal device (not shown) to prevent condensation of the vaporized fountain solution back onto the imaging plate.

As noted above, currently there is no way to measure how much fountain solution is deposited on the imaging member blanket surface 26 in real-time during a printing operation. One drawback in trying to measure the thickness of fountain solution directly on the imaging blanket is that the top surface of the blanket is coated with a fluorosilicone/carbon black solution. The carbon black is added to absorb the laser light during the imaging process. The carbon black also makes it very difficult to measure the fountain solution on the blanket during image forming operations using a non-contact specular sensor because light is absorbed by the blanket. In other words, the blanket on the surface of the imaging member that accepts the fountain solution and ink for printing is non-reflective having, for example, carbon black and cured with polyfluorene silicon. This non-reflective imaging member surface does not support a typical reflective measurement approach to analyze the surface or the thickness of any applied thin film of fountain solution. An additional drawback of the fluorosilicone/carbon black imaging member surface is that any contact sensors scuff/abrade the surface causing defects objectionable in the print.

Referring back to FIG. 1, the inventors found an approach to determining fountain solution thickness on the imaging member surface with a light reflectance measurement system 58, including a light-reflectance detector such as an ellipsometer, spatially separate from the imaging member surface and operated to measure a light reflectance from the imaging member surface 26. However, as noted above, the imaging member surface is considered non-reflective. In examples, a reflective substrate may be attached to the non-reflective imaging member surface 26 to form a reflective surface on the otherwise non-reflective imaging member surface. Referring to FIG. 2, reflective substrate 80 is attached to the imaging member 24 to form a reflective surface on the otherwise non-reflective imaging member surface. The reflective substrate 80 may be attached to the imaging member surface 26 at locations of the surface not used for imaging, such as at non-image forming regions 82 of the imaging member surface. While not being limited to a particular theory, non-image forming regions 82 may be located in margins of the imaging member surface outside the periphery of imageable area 84 where imaging forming occurs, including first and second side gutters 86, 88 at opposite sides of the central imageable area 84.

The reflective substrate 80 is an additional material that in certain examples is placed outside the imageable area 84 of the imaging member surface 26 to enable measurement of fountain solution on the imaging member surface without disturbing image forming (e.g., latent image forming, laser imaging) in the non-reflective imageable areas 48 thereof. When attached to the imaging member surface 26, the reflective substrate 80 provides a surface that reflects light, including a light beam to the light reflectance measurement system 58 for measurement of the light's reflectance off the reflective substrate 80 and through the deposited fountain solution layer 32. The reflective substrate 80 may include reflective material (e.g., silver, aluminum, metal oxides, white/bright silicon, white/bright fluoroelastomers, white/bright Teflon) and may form a smooth reflective surface if desired to aid reflecting and measuring light reflectance. White or bright colored Teflon may be anodized to aluminum. Hardcoat/PTFE anodizing is a special application of a controlled oxide film on aluminum with the inclusion of polytetrafluoroethylene (PTFE) molecules. A resultant coating provides the dense, hard protection of Type III hardcoat anodizing coupled with excellent dry lubrication of PTFE.

Still referring to FIG. 2, the reflective substrate 80 may be attached around the circumference of the imaging member surface along the non-image forming regions 82 by chemical deposition, sputtering, adhesive or other manner understood by a skilled artisan. Exemplary approaches for adhering materials to the imaging member (e.g., aluminum drum) may include an electrostatic process. Thin coat flow coating technology that may use minimal raw materials and is almost solvent free may be used to coat the imaging member. The reflective substrate 80 may be continuous strip or strip sections and are not limited to any particular pattern or layout around the imaging member surface. For example, the reflective substrate 80 may be attached in a continuous band 90, strip sections 92, curved strips or any combination thereof, such as a chevron inverted V shape 94 or herringbone pattern. The reflective strips may be shaped to indicate reference marks of the imaging member surface, with the reference marks helping to enable measurement at specific areas, such as the same point or intervals (e.g., 5°, 10°, 20°, 30°, 36°, 40°, 45°, 60°, 72°, 90°, 120°, 180°, 360°) around the imaging member surface. The pattern or reference mark strips may be used at a desired frequency to further enable the control of accurate measurements.

While not being limited to a particular theory, the thickness of the fountain solution layer 32 may be determined and traced using Ellipsometry, an approach for measuring the amount of light reflectance off the reflective substrate 80 and through the fountain solution layer at a non-normal incidence and at two different polarizations. Differences in light reflectance caused by the fountain solution layer 32 (also referred to herein as light reflectance delta) may help determine the fountain solution layer thickness. The light reflectance, light reflectance delta and associated fountain solution layer thickness may be measured any number of times over a period of time and/or dynamically. For example, fountain solution thickness may be measured continuously by dynamic measurement of light reflectance off a continuous band of the reflective solution 90, 94 around the perimeter of the imaging member surface or blanket.

The measurements may be taken of the reflective substrate 80 located outside of the printable area so as to not interfere with imaging within the printable area. During operation, as the imaging member rotates, the fountain solution applicator 14 deposits a layer 32 of fountain solution across the width W of the imaging member onto its surface. Light reflectance measurements may be taken before, after or as the laser 36 forms a latent image. Fountain solution layer thickness may be determined by interference between light reflecting from the reflective substrate 80 and light that also travels through the film of fountain solution. Depending on the relative phase of the rejoining light to the surface reflection, interference can be defined as constructive or destructive. While in examples the frequency, phase and wavelength of each emitted light beam is controlled, the superposition of multiple light waves introduces interference that depends on the relative phase of each light wave, as understood by a skilled artisan. The interference involves both amplitude and phase information. A feedback loop may provide the interference measurements and corresponding fountain solution measurement to the controller of the image forming device to modify the fountain solution dispense rate as needed, which modifies the fountain solution layer thickness accordingly.

As can be seen in FIG. 1, the light reflectance measurement system 58 may be affixed to the image forming device 10 above the imaging member surface 26 and form a gap therebetween (e.g., less than 1000 μm, between about 10 μm and 750 μm) to non-invasively measure a light reflectance interference from the fountain solution fluid layer 32 on the imaging member reflective substrate surface, if desired in real-time during a printing operation. In examples, the measurement system 58 may be positioned downstream the fountain solution applicator 14 and adjacent the optical patterning subsystem 16. While the measurement system 58 can be seen in FIG. 1 before the optical patterning subsystem to measure fountain solution before latent image forming, it is understood that this relationship is merely one example and the measurement system 58 may be next to the optical patterning subsystem to measure light reflectance as the laser 36 forms a latent image. Concurrent latent image forming and light reflectance measurements may be beneficial for determining fountain solution thickness during laser imaging. In other examples the measurement system 58 may be downstream the optical patterning to measure light reflectance after latent image forming.

As noted above, light reflectance, light reflectance delta and associated fountain solution layer thickness may be measured any number of times over a period of time and/or dynamically. Fountain solution layer 32 thickness quality control monitoring may be applied automatically during the printing process with periodic sampling during a single printing or multiple printings. This way fountain solution flow rate adjustment can be made "on the fly", reducing or eliminating the production of printings having undesired lessened quality.

Still referring to FIG. 1 the optical patterning subsystem 16 is located downstream the fountain solution applicator 14 and the light reflectance measurement system 58 in the printing processing direction to selectively pattern a latent image in the layer of fountain solution by image-wise patterning using, for example, laser energy. In examples, the fountain solution layer is exposed to an energy source (e.g. a laser) that selectively applies energy to portions of the layer to image-wise evaporate the fountain solution and create a latent "negative" of the ink image that is desired to be printed on a receiving substrate 34. Image areas are created where ink is desired, and non-image areas are created where the fountain solution remains. While the optical patterning subsystem 16 is shown as including laser emitter 36, it should be understood that a variety of different systems may be used to deliver the optical energy to pattern the fountain solution layer.

A vapor vacuum 38 or air knife may be positioned downstream the optical patterning subsystem to collect vaporized fountain solution and thus avoid leakage of excess fountain solution into the environment. Reclaiming excess vapor prevents fountain solution from depositing uncontrollably prior to the inking apparatus 18 and imaging member 24 interface. The vapor vacuum 38 may also prevent fountain solution vapor from entering the environment. Reclaimed fountain solution vapor can be condensed, filtered and reused as understood by a skilled artisan to help minimize the overall use of fountain solution by the image forming device 10.

Following patterning of the fountain solution layer by the optical patterning subsystem 16, the patterned layer over the reimageable surface 26 is presented to the inking apparatus 18. The inker apparatus 18 is positioned downstream the optical patterning subsystem 16 to apply a uniform layer of ink over the layer of fountain solution and the reimageable surface layer 26 of the imaging member 24. The inking apparatus 18 may deposit the ink to the evaporated pattern representing the imaged portions of the reimageable surface 26, while ink deposited on the unformatted portions of the fountain solution will not adhere based on a hydrophobic and/or oleophobic nature of those portions. The inking apparatus may heat the ink before it is applied to the surface 26 to lower the viscosity of the ink for better spreading into imaged portion pockets of the reimageable surface. For example, one or more rollers 40 of the inking apparatus 18 may be heated, as well understood by a skilled artisan. Inking roller 40 is understood to have a structure for depositing marking material onto the reimageable surface layer 26, and may include an anilox roller or an ink nozzle. Excess ink may be metered from the inking roller 40 back to an ink container 42 of the inker apparatus 18 via a metering member 44 (e.g., doctor blade, air knife).

Although the marking material may be an ink, such as a UV-curable ink, the disclosed embodiments are not intended to be limited to such a construct. The ink may be a UV-curable ink or another ink that hardens when exposed to UV radiation. The ink may be another ink having a cohesive bond that increases, for example, by increasing its viscosity. For example, the ink may be a solvent ink or aqueous ink that thickens when cooled and thins when heated.

Downstream the inking apparatus 18 in the printing process direction resides ink image transfer station 46 that transfers the ink image from the imaging member surface 26 to a print substrate 34. The transfer occurs as the substrate 34 is passed through a transfer nip 48 between the imaging member 24 and an impression roller 50 such that the ink within the imaged portion pockets of the reimageable surface 26 is brought into physical contact with the substrate 34 and transfers via pressure at the transfer nip from the imaging member surface to the substrate as a print of the image.

Rheological conditioning subsystems 22 may be used to increase the viscosity of the ink at specific locations of the digital offset image forming device 10 as desired. While not being limited to a particular theory, rheological conditioning subsystem 22 may include a curing mechanism 52, such as a UV curing lamp (e.g., standard laser, UV laser, high powered UV LED light source), wavelength tunable photoinitiator, or other UV source, that exposes the ink to an amount of UV light (e.g., # of photons radiation) to at least partially cure the ink/coating to a tacky or solid state. The curing mechanism may include various forms of optical or photo curing, thermal curing, electron beam curing, drying, or chemical curing. In the exemplary image forming device 10 depicted in FIG. 1, rheological conditioning subsystem 22 may be positioned adjacent the substrate 34 downstream the ink image transfer station 46 to cure the ink image transferred to the substrate. Rheological conditioning subsystems 22 may also be positioned adjacent the imaging member surface 26 between the ink image transfer station 46 and cleaning device 20 as a preconditioner to harden any residual ink 54 for easier removal from the imaging member surface 26 that prepares the surface to repeat the digital image forming operation.

This residual ink removal is most preferably undertaken without scraping or wearing the imageable surface of the imaging member. Removal of such remaining fluid residue may be accomplished through use of some form of cleaning device 20 adjacent the surface 26 between the ink image transfer station 46 and the fountain solution applicator 14. Such a cleaning device 20 may include at least a first cleaning member 56 such as a sticky or tacky roller in physical contact with the imaging member surface 26, with the sticky or tacky roller removing residual fluid materials (e.g., ink, fountain solution) from the surface. The sticky or tacky roller may then be brought into contact with a smooth roller (not shown) to which the residual fluids may be transferred from the sticky or tacky member, the fluids being subsequently stripped from the smooth roller by, for example, a doctor blade or other like device and collected as waste. It is understood that the cleaning device 20 is one of numerous types of cleaning devices and that other cleaning devices designed to remove residual ink/fountain solution from the surface of imaging member 24 are considered within the scope of the embodiments. For example, the cleaning device could include at least one roller, brush, web, belt, tacky roller, buffing wheel, etc., as well understood by a skilled artisan.

Figure 5:
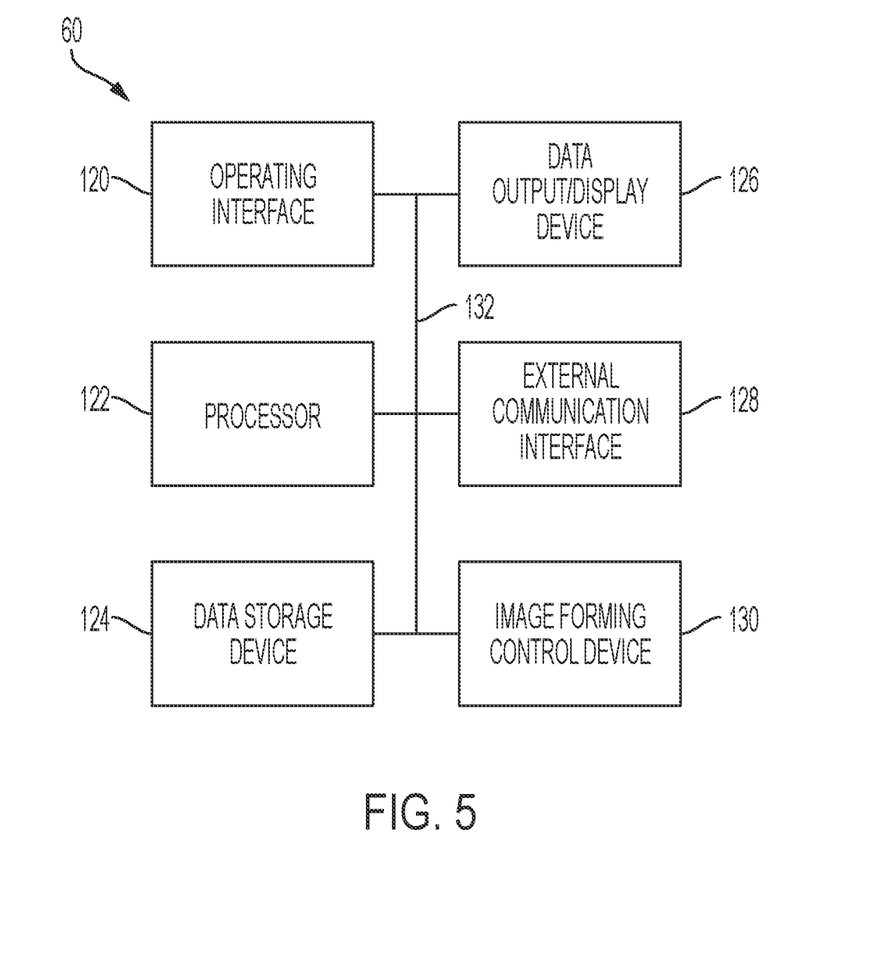
FIG. 5 is a block diagram of a controller for executing instructions to control the digital image forming device.

In the image forming device 10, functions and utility provided by the dampening station 12, optical patterning subsystem 16, inking apparatus 18, cleaning device 20, rheological conditioning subsystems 22, imaging member 24 and light reflectance measurement system 58 may be controlled, at least in part by controller 60. Such a controller 60 is shown in FIGS. 1 and 5, and may be further designed to receive information and instructions from a workstation or other image input devices (e.g., computers, smart phones, laptops, tablets, kiosk) to coordinate the image formation on the print substrate through the various subsystems such as the dampening station 12, patterning subsystem 16, inking apparatus 18, imaging member 24 and measurement system 58 as discussed in greater detail herein and understood by a skilled artisan. The controller 60 may use the measurements to determine thickness of the deposited fountain solution, for example according to a reflectance or interference vs fountain solution fluid thickness relationship.

Figure 3:
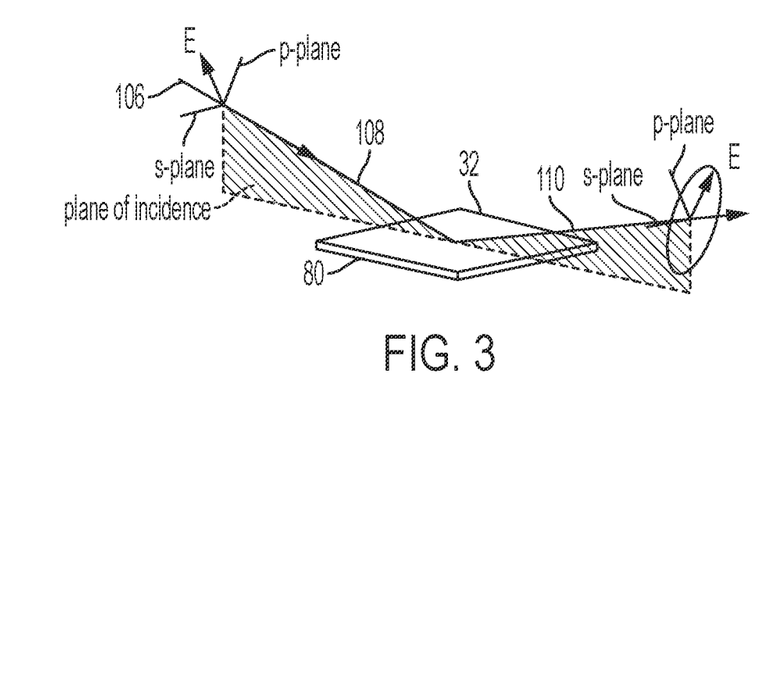
FIG. 3 illustrates an exemplary illustration of Ellipsometry.

Specific examples may use Ellipsometry, which measures the amount of light reflectance at a non-normal incidence and at two different polarizations, to track the thickness of the fountain solution layer 32. An exemplary illustration of Ellipsometry is depicted in FIG. 3. Ellipsometry is primarily interested in how p- and s-components change upon reflection or transmission in relation to each other. In this manner, a reference beam of incident light 98 is part of the light reflectance measurement system 58. The incident light 98 is linear with both p- and s-components. The incident light is reflected off a sample (e.g., reflective substrate 80, reflective substrate covered with a fountain solution layer 32) into reflected light that has undergone amplitude and phase changes for both p- and s-polarized light. In examples, a known polarization is reflected or transmitted from the imaging member surface 26 reflective substrate 80 and a resultant output polarization is measured. The change in polarization is the Ellipsometry measurement, and may be written as:

$$\rho = \tan(\Psi) e^{i\Delta}.$$

Figure 4:
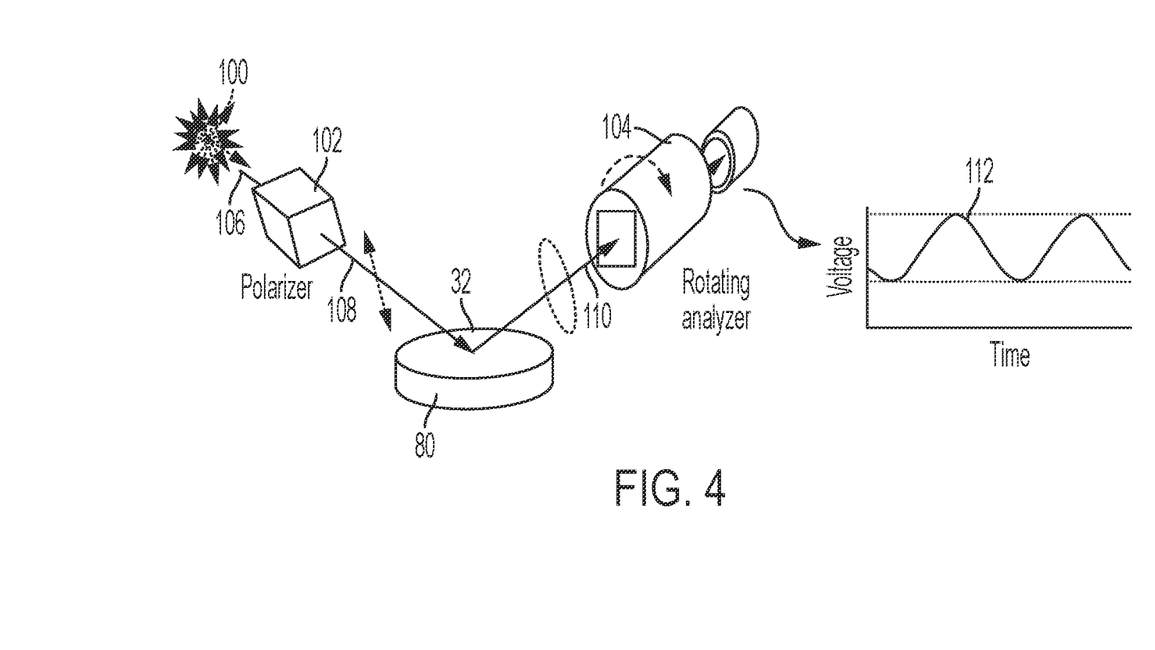
FIG. 4 illustrates an exemplary light reflectance measurement system.

FIG. 4 depicts an exemplary light reflectance measurement system 58 configured to measure a light reflectance from the reflective substrate 80 on the imaging member. The measurement system 58 may include a light beam emitter 100, a polarizer 102 and a light-reflectance detector 104. The light beam emitter 100 (diode, light bulb, light source) produces unpolarized light 106. The light 106 is sent through the polarizer 102, which may allow light of an electric field orientation to pass as polarized light 108. In examples, the polarizer 102 has an axis oriented between p- and s-planes (FIG. 3), such that both planes arrive at the imaging member surface 26. The linearly polarized light 108 reflects from reflective substrate 80 on the imaging member surface as reflected polarized light 110, may become elliptically polarized, and travels through the reflectance detector 104. The reflectance detector 104 may be a continuously rotating polarizer such as a rotational analyzer ellipsometer (RAE). The amount of reflected polarized light 110 allowed to pass through the reflectance detector 104 depends on the polarizer 102 orientation relative to the electric field "ellipse" coming from the reflective substrate 80 on the imaging member surface 26.

The reflectance detector 104 shown in the example illustrated in FIG. 4 is a rotational analyzer ellipsometer that measures the amount of light reflectance at a non-normal incidence and at two different polarizations to determine the thickness of the fountain solution. The thickness may be determined by interference between reflected polarized light 110 reflecting from the reflective substrate surface and reflected polarized light also traveling through the fountain solution layer 32. Fountain solution covering the reflective substrate causes interference in the polarized light 108 and reflected polarized light 110 travelling through the fountain solution, with the amount of interference related to the thickness of the fountain solution layer 32. The reflectance detector 104 converts reflected polarized light travelling therethrough to an electronic signal 112 (e.g., voltage/time) to determine the light reflectance (e.g., reflected polarization). This signal information may be compared to the known input polarization to determine the polarization change caused by the light reflection. If there is no fountain solution, the system would detect a zero thickness fountain solution layer. The interference caused by the fountain solution layer 32 over the reflective substrate may be compared to polarization change caused by reflectance off bare reflective substrate having no fountain solution thereon to determine fountain solution thickness.

The Ellipsometry measurement results may be used to monitor fountain solution layer 32 thickness, and if desired, enable the image forming device 10 to control fountain solution layer thickness by modifying a dispense rate of the fountain solution onto the imaging member surface. In other words, based on light reflectance interference measurements of the fountain solution fluid layer 32 on the imaging member reflective substrate surface with reflectance detector 104 spatially separate from the imaging member surface, image forming device 10 may modify the fountain solution dispense rate onto the imaging member 24 as needed to arrive at or maintain a desired fountain solution thickness (e.g., less than 5 μm, between about 5 nm and 200 nm, about 10 nm to 100 nm).

In examples, the controller 60 may compare the measured light reflectance interference value to a target interference value that may correspond to about +/−5% of the desired fountain solution thickness. In this instance, fountain solution thickness may not need to be determined from the measured light reflectance interference, as interference values may generally correspond to a range of fountain solution thickness such that the controller 60 may compare the measured light reflectance interference value to a target interference value and adjust fountain solution flow based on the comparison. The target light reflectance interference value may be predefined and stored in a data storage device 124 (FIG. 5). Typically the light reflectance interference caused by the fountain solution is directly proportional to fountain solution thickness.

In other examples, the controller 60 may estimate a thickness of the applied fountain solution fluid layer based on the measured light reflectance interference value and modify fountain solution dispense rate based on the estimated thickness of the applied fountain solution fluid layer. For example, the controller 60 may estimate or determine fountain solution thickness via a lookup table or database stored in data storage device 124 (FIG. 5) of the controller, with the lookup table/database providing estimates of fountain solution thickness based on measured light reflectance interference. The controller 60 may then compare the estimated thickness of the applied fountain solution fluid layer with a target thickness (e.g., less than 5 µm, between about 5 nm and 200 nm, about 10 nm to 100 nm), and adjust the fountain solution dispense rate as needed based on the comparison between the estimated thickness of the applied fountain solution fluid layer and the target thickness.

The controller 60 may thus modify or direct modification of the fountain solution dispense rate based on the light reflectance interference measurement, or based on the fountain solution layer thickness determined or estimated according to the light reflectance interference measurement. The controller 60 may determine the fountain solution thickness by correlating light reflectance interference measurements of the fountain solution layer 32 on imaging member reflective substrate 80 surface using, for example, a look up table (LUT) that may list fountain solution thickness interference values and corresponding fountain solution thicknesses. The controller 60 may access a lookup table (LUT) in data storage device 124 (FIG. 5) for correlation between light reflectance interference and fountain solution thickness. Further, the controller 60 may access the LUT to determine an amount of modification of the fountain solution flow rate is needed to reach or maintain the desired fountain solution layer thickness.

While measurement of the fountain solution thickness is not required for the print process discussed herein including modifying fountain solution dispense/deposition rate in real time, it may be beneficial to measure fountain solution light reflectance interference that directly correlates to the fountain solution thickness. To this end, the digital image forming device 10 can control fountain solution thickness on the imaging member surface 26 regardless of knowing the actual thickness. For example, upon measuring the fountain solution light reflectance interference on the imaging member reflective substrate surface with the light reflectance measurement system 58, the controller 60 may then compare the measured light reflectance interference with a target light reflectance interference corresponding to the desired fountain solution layer thickness and modify the fountain solution dispense or flow rate accordingly. It is also understood that the light reflectance interference measurement and fountain solution dispense rate modification may occur at different times and is not limited to occurrence during a print job by the digital image forming device 10. In other words, light reflectance interference measurement and fountain solution dispense rate modification may occur during a print job, between print jobs, or even when no print job is scheduled.

FIG. 5 illustrates a block diagram of the controller 60 for executing instructions to automatically control the digital image forming device 10 and components thereof. The exemplary controller 60 may provide input to or be a component of a controller for executing the image formation method including controlling fountain solution thickness in a system such as that depicted in FIGS. 1, 2 and 4, and described in greater detail below.

The exemplary controller 60 may include an operating interface 120 by which a user may communicate with the exemplary control system. The operating interface 120 may be a locally-accessible user interface associated with the digital image forming device 10. The operating interface 120 may be configured as one or more conventional mechanism common to controllers and/or computing devices that may permit a user to input information to the exemplary controller 60. The operating interface 120 may include, for example, a conventional keyboard, a touchscreen with "soft" buttons or with various components for use with a compatible stylus, a microphone by which a user may provide oral commands to the exemplary controller 60 to be "translated" by a voice recognition program, or other like device by which a user may communicate specific operating instructions to the exemplary controller. The operating interface 120 may be a part or a function of a graphical user interface (GUI) mounted on, integral to, or associated with, the digital image forming device 10 with which the exemplary controller 60 is associated.

The exemplary controller 60 may include one or more local processors 122 for individually operating the exemplary controller 60 and for carrying into effect control and operating functions for image formation onto a print substrate 34, including rendering digital images, measuring light reflectance interference to determine thickness of fountain solution applied by a fountain solution applicator on an imaging member surface and/or determine image forming device real-time image forming modifications for subsequent printings. For example, in real-time during the printing of a print job, based on the measured light reflectance interference of the fountain solution layer or film on the imaging member, processors 122 may adjust image forming (e.g., fountain solution deposition flow rate) to reach or maintain a preferred fountain solution thickness on the imaging member surface for subsequent (e.g., next) printings of the print job with the digital image forming device 10 with which the exemplary controller may be associated. Processor(s) 122 may include at least one conventional processor or microprocessor that interprets and executes instructions to direct specific functioning of the exemplary controller 60, and control adjustments of the image forming process with the exemplary controller.

The exemplary controller 60 may include one or more data storage devices 124. Such data storage device(s) 124 may be used to store data or operating programs to be used by the exemplary controller 60, and specifically the processor(s) 122. Data storage device(s) 124 may be used to store information regarding, for example, digital image information, printed image response data, fountain solution thickness corresponding to light reflectance interference, a target fountain solution thickness and/or corresponding light reflectance interference, and other fountain solution deposition information with which the digital image forming device 10 is associated. Stored fountain solution light reflectance interference and thickness data may be devolved into data to generate a recurring, continuous or closed loop feedback fountain solution deposition rate modification in the manner generally described by examples herein.

The data storage device(s) 124 may include a random access memory (RAM) or another type of dynamic storage device that is capable of storing updatable database information, and for separately storing instructions for execution of image correction operations by, for example, processor(s) 122. Data storage device(s) 124 may also include a read-only memory (ROM), which may include a conventional ROM device or another type of static storage device that stores static information and instructions for processor(s) 122. Further, the data storage device(s) 124 may be integral to the exemplary controller 60, or may be provided external to, and in wired or wireless communication with, the exemplary controller 60, including as cloud-based data storage components.

The data storage device(s) 124 may include non-transitory machine-readable storage medium used to store the device queue manager logic persistently. While a non-transitory machine-readable storage medium is may be discussed as a single medium, the term "machine-readable storage medium" should be taken to include a single medium or multiple media (e.g., a centralized or distributed database, and/or associated caches and servers) that store one or more sets of instructions. The term "machine-readable storage medium" shall also be taken to include any medium that is capable of storing or encoding a set of instruction for execution by the controller 60 and that causes the digital image forming device 10 to perform any one or more of the methodologies of the present invention. The term "machine-readable storage medium" shall accordingly be taken to include, but not be limited to, solid-state memories, and optical and magnetic media.

The exemplary controller 60 may include at least one data output/display device 126, which may be configured as one or more conventional mechanisms that output information to a user, including, but not limited to, a display screen on a GUI of the digital image forming device 10 or associated image forming device with which the exemplary controller 60 may be associated. The data output/display device 126 may be used to indicate to a user a status of the digital image forming device 10 with which the exemplary controller 60 may be associated including an operation of one or more individually controlled components at one or more of a plurality of separate image processing stations or subsystems associated with the image forming device.

The exemplary controller 60 may include one or more separate external communication interfaces 128 by which the exemplary controller 60 may communicate with components that may be external to the exemplary control system such as light reflectance measurement system 58 that can monitor fountain solution light reflectance interference and related fountain solution layer thickness. At least one of the external communication interfaces 128 may be configured as an input port to support connecting an external CAD/CAM device storing modeling information for execution of the control functions in the image formation and correction operations. Any suitable data connection to provide wired or wireless communication between the exemplary controller 60 and external and/or associated components is contemplated to be encompassed by the depicted external communication interface 128.

The exemplary controller 60 may include an image forming control device 130 that may be used to control an image correction process including fountain solution deposition rate control and modification to render images on imaging member surface 26 having a desired fountain solution thickness. For example, the image forming control device 130 may render digital images on the reimageable surface 26 having a desired fountain solution thickness from fountain solution flow adjusted automatically in real-time based on fountain solution light reflectance interference measurements of prior printings of the same print job. The image forming control device 130 may operate as a part or a function of the processor 122 coupled to one or more of the data storage devices 124 and the digital image forming device 10 (e.g., optical patterning subsystem 16, inking apparatus 18, dampening station 12), or may operate as a separate stand-alone component module or circuit in the exemplary controller 60.

All of the various components of the exemplary controller 60, as depicted in FIG. 5, may be connected internally, and to the digital image forming device 10, associated image forming apparatuses downstream the image forming device and/or components thereof, by one or more data/control busses 132. These data/control busses 132 may provide wired or wireless communication between the various components of the image forming device 10 and any associated image forming apparatus, whether all of those components are housed integrally in, or are otherwise external and connected to image forming devices with which the exemplary controller 60 may be associated.

It should be appreciated that, although depicted in FIG. 5 as an integral unit, the various disclosed elements of the exemplary controller 60 may be arranged in any combination of subsystems as individual components or combinations of components, integral to a single unit, or external to, and in wired or wireless communication with the single unit of the exemplary control system. In other words, no specific configuration as an integral unit or as a support unit is to be implied by the depiction in FIG. 5. Further, although depicted as individual units for ease of understanding of the details provided in this disclosure regarding the exemplary controller 60, it should be understood that the described functions of any of the individually-depicted components, and particularly each of the depicted control devices, may be undertaken, for example, by one or more processors 122 connected to, and in communication with, one or more data storage device(s) 124.

Figure 6:
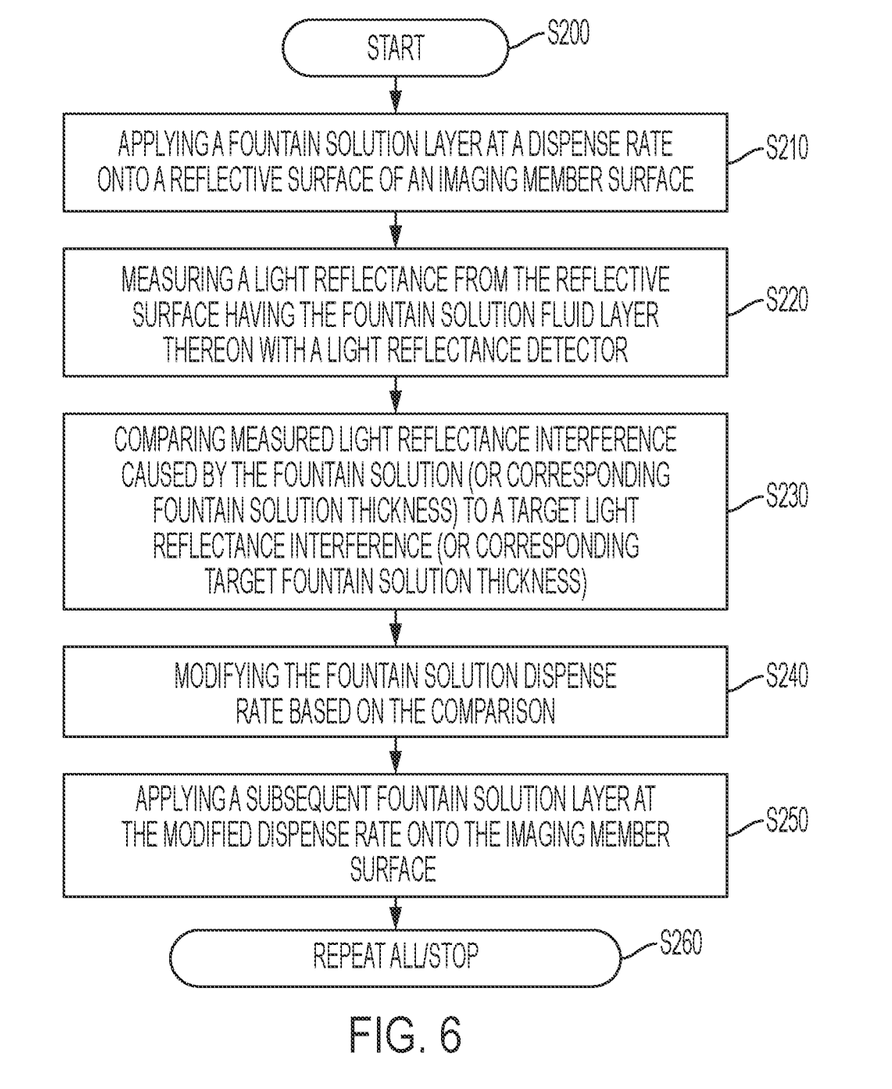
FIG. 6 is a flowchart depicting the operation of an exemplary image forming device.

The disclosed embodiments may include an exemplary method for controlling fountain solution thickness on an imaging member surface of a rotating imaging member in a digital image forming device 10, with the rotating imaging member including sections of reflective substrate on non-imaging areas of the imaging member surface. FIG. 6 illustrates a flowchart of such an exemplary method. As shown in FIG. 6, operation of the method commences at Step S200 and proceeds to Step S210.

At Step S210, a fountain solution applicator applies a fountain solution fluid layer at a dispense rate onto a reflective substrate of an imaging member surface. The imaging member surface is non-reflective except for portions including a reflective substrate. The reflective substrate is attached to the non-reflective imaging member surface at non-image forming regions along a gutter of the imaging member surface outside an imageable area of the imaging member surface to form a reflective surface on the otherwise non-reflective surface. In Step S210 the fountain solution fluid layer is applied by a fountain solution applicator onto both the reflective surface and the non-reflective surface.

Operation of the method proceeds to Step S220, where a light reflectance measurement system measures light reflectance on the imaging member reflective substrate surface as a light reflectance value. In examples, the light reflectance measurement system may measure light reflectance by emitting unpolarized light that is sent through a polarizer, which may allow light of an electric field orientation to pass as polarized light. The polarized light reflects from the reflective imaging member surface with interference from fountain solution on the reflective surface as reflected polarized light, and travels through a reflectance detector. The reflectance detector measures the light reflectance, for example by converting reflected polarized light travelling therethrough to an electronic signal (e.g., voltage/time).

After the light reflectance interference measurement, the controller determines the interference caused by the fountain solution on the reflected surface based on a difference between the measured reflectance and a base reflectance value off the reflective surface bare of fountain solution. The controller may also estimate the thickness of the fountain solution fluid layer on the reflected surface that corresponds to the measured light reflectance, for example as described in greater detail above. Operation proceeds to Step S230, where the controller 60 compares the measured light reflectance interference (or corresponding fountain solution thickness) to a target light reflectance (or corresponding target fountain solution thickness). In examples the target light reflectance interference corresponds to the target fountain solution thickness desired for optimal printing. If the measured light reflectance interference or corresponding fountain solution thickness is higher than the target light reflectance or corresponding target fountain solution thickness, then too much fountain solution is being applied to the imaging member surface, and the laser may not be able to sufficiently boil/evaporate/ablate the fountain solution layer to create a clear latent image on the blanket. If the measured light reflectance interference value or corresponding fountain solution thickness is lower than the target light reflectance interference value or corresponding target fountain solution thickness, then too little fountain solution is being applied to the imaging member surface, and subsequently applied ink will not be sufficiently rejected in non-imaged regions leading to overly thick ink images with too much background. Information regarding corresponding light reflectance interference and fountain solution thickness, as well as target fountain solution light reflectance interference/thickness information may be stored in data storage device 124 as depicted in FIG. 5 or as a lookup table for access to the controller 60.

Operation of the method proceeds to Step S240, where the fountain solution dispense rate is modified as needed based on the comparison for subsequent printing using the modified fountain solution dispense rate. The fountain solution dispense rate may be modified by the digital image forming device 10 via instruction from the controller 60. For example, if the measured light reflectance interference or corresponding fountain solution thickness is higher than the target light reflectance interference or corresponding target fountain solution thickness, then the fountain solution dispense rate is lowered accordingly. Likewise, if the measured light reflectance interference or corresponding fountain solution thickness is lower than the target light reflectance interference or corresponding target fountain solution thickness, then the fountain solution dispense rate is increased accordingly.

Operation of the method proceeds to Step S250, where the fountain solution applicator applies a subsequent fountain solution fluid layer at the modified dispense rate onto the imaging member surface. Operation may cease at Step S260, or may continue by repeating back to Step S220 where light reflectance measurement system again measures light reflectance interference caused by the fountain solution fluid layer on the reflective substrate.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 6, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of image forming elements common to offset inking system in many different configurations. For example, although digital lithographic systems and methods are shown in the discussed embodiments, the examples may apply to analog image forming systems and methods, including analog offset inking systems and methods. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. An image forming device for controlling fountain solution thickness on a non-reflective imaging member surface of a rotating imaging member, comprising:
   a reflective substrate attached to the non-reflective imaging member surface at non-image forming regions along a first side gutter of the imaging member surface outside a imageable area of the imaging member surface to form a reflective surface on the otherwise non-reflective surface, the imaging member surface having a layer of fountain solution fluid dispensed on both the reflective surface and the non-reflective surface at a fountain solution dispense rate;
   a light reflectance detector spatially separate from the imaging member surface forming a gap therebetween, the light reflectance detector configured to measure a light reflectance from the reflective surface with the fountain solution fluid layer thereon; and
   a controller in communication with the light reflectance detector and the fountain solution applicator to modify the fountain solution dispense rate based on the measured light reflectance.

2. The image forming device of claim 1, further comprising a fountain solution applicator configured to apply the fountain solution fluid layer at the fountain solution dispense rate onto the imaging member surface for a printing.

3. The image forming device of claim 2, the fountain solution applicator configured to apply a subsequent fountain solution layer at the modified fountain solution dispense rate onto the imaging member surface for a subsequent printing.

4. The image forming device of claim 1, the imageable area defined by regions of the non-reflective imaging member surface that may be imaged by a laser.

5. The image forming device of claim 1, further comprising a reference mark on the first side gutter used to identify a location of the reflective substrate.

6. The image forming device of claim 1, further comprising a second reflective substrate attached to the imaging member surface at second non-image forming regions of the imaging member surface outside a imageable area of the imaging member surface at a second side gutter of the imaging member surface opposite the first side gutter.

7. The image forming device of claim 1, wherein the imaging member is cylindrical and the reflective substrate is shaped in a zig-zag pattern evenly spaced around the non-image forming regions.

8. The image forming device of claim 1, wherein the light reflectance detector includes a rotational analyzer ellipsometer that measures the amount of light reflectance at a non-normal incidence and at two different polarizations to determine the thickness of the fountain solution, the thickness being determined by interference between light reflecting from the reflective substrate surface and reflective light also traveling through the fountain solution layer.

9. The image forming device of claim 8, further comprising a light beam emitter producing unpolarized light that is sent through a polarizer, the polarizer allowing light of an electric field orientation to pass, with the polarizer having an axis oriented between p- and s-planes.

10. The image forming device of claim 1, wherein the fountain solution thickness is determined by an interference between the measured light reflectance and a known input polarization to determine the polarization change caused by the reflection through the fountain solution layer, the interference including amplitude and phase information.

11. The image forming device of claim 1, the controller being configured to compare the measured light reflectance to a target light reflectance and modify the fountain solution dispense rate based on the comparison.

12. The image forming device of claim 1, wherein the controller is configured to estimate a thickness of the applied fountain solution fluid layer based on the measured light reflectance and modify the fountain solution dispense rate based on the estimated thickness of the applied fountain solution fluid layer.

13. A method of controlling fountain solution thickness on a non-reflective imaging member surface of a rotating imaging member, comprising:
(a) applying a fountain solution fluid layer at a dispense rate onto the imaging member surface, the imaging member surface being non-reflective with a reflective substrate attached to the non-reflective imaging member surface at non-image forming regions along a gutter of the imaging member surface outside a imageable area of the imaging member surface to form a reflective surface on the otherwise non-reflective surface, the fountain solution fluid layer being dispensed on both the reflective surface and the non-reflective surface at the fountain solution dispense rate with a fountain solution applicator;
(b) measuring a light reflectance from the reflective surface having the fountain solution fluid layer thereon with a light reflectance detector spatially separate from the imaging member surface and forming a gap therebetween; and
(c) modifying the fountain solution dispense rate via controller in communication with the light reflectance detector and the fountain solution applicator based on the measured light reflectance.

14. The method of claim 13, further comprising attaching the reflective substrate to the non-reflective imaging member surface at the non-image forming regions.

15. The method of claim 13, further comprising applying a subsequent fountain solution fluid layer at the modified fountain solution dispense rate onto the imaging member surface with the fountain solution applicator for a subsequent printing.

16. The method of claim 13, the Step (b) further comprising measuring the amount of light reflectance at a non-normal incidence and at two different polarizations with a rotational analyzer ellipsometer to determine the thickness of the fountain solution, the thickness being determined by interference between light reflecting from the reflective substrate surface and reflective light also traveling through the fountain solution layer.

17. The method of claim 16, the Step (b) further comprising emitting unpolarized light through a polarizer with a light beam emitter, the polarizer allowing light of an electric field orientation to pass, with the polarizer having an axis oriented between p- and s-planes.

18. The method of claim 13, further comprising determining the fountain solution thickness by an interference between the measured light reflectance and a known input polarization to determine the polarization change caused by the reflection through the fountain solution layer, the interference including amplitude and phase information.

19. The method of claim 13, the Step (c) further comprising comparing the measured light reflectance to a target light reflectance and modifying the fountain solution dispense rate based on the comparison.

20. An image forming device for controlling a fountain solution dispense rate, comprising
a rotatable imaging member having an imaging member surface that is non-reflective over an imageable area thereon, the imaging member surface including a reflective substrate attached at non-image forming regions thereon along a first side gutter of the imaging member surface outside the imageable area, the imaging member surface having a layer of fountain solution fluid dispensed on portions of both the imageable area and the non-image forming regions at a fountain solution dispense rate;
a light reflectance detector spatially separate from the imaging member surface forming a gap therebetween, the light reflectance detector configured to measure a light reflectance from the reflective substrate with the fountain solution fluid layer thereon; and
a controller in communication with the light reflectance detector and the fountain solution applicator, the controller configured to determine an interference between light reflectance from the reflective substrate and the measured light reflectance from the reflective substrate with the fountain solution fluid layer thereon, the controller further configured to modify the fountain solution dispense rate based on the interference.

* * * * *